(12) United States Patent
Calvillo (10) Patent No.: US 7,020,927 B2
(45) Date of Patent: Apr. 4, 2006

(54) MULTILAYER PERSONAL HYGIENE SYSTEM

(76) Inventor: Ophelia Dolores Calvillo, 607 Tailwind Dr., Sacramento, CA (US) 95838

( * ) Notice: Subject to any disclaimer, the term of this patent is extended or adjusted under 35 U.S.C. 154(b) by 246 days.

(21) Appl. No.: 10/271,515

(22) Filed: Oct. 15, 2002

(65) Prior Publication Data

US 2004/0068813 A1    Apr. 15, 2004

(51) Int. Cl.
*B08B 1/00* (2006.01)

(52) U.S. Cl. .................. 15/104.93; 15/118; 15/209.1; 15/210.1

(58) Field of Classification Search ............. 15/104.93, 15/118, 209.1, 244.1, 244.4, 210.1, 229.14, 15/227; 206/494, 449, 812, 524.3; 428/35.6, 428/47; 132/320, 317; 604/385.01, 378, 604/304, 289, 303, 290, 293, 308, 312
See application file for complete search history.

(56) References Cited

U.S. PATENT DOCUMENTS

| | | | | |
|---|---|---|---|---|
| 2,932,839 A | * | 4/1960 | Flanigan et al. | 401/201 |
| 5,009,652 A | * | 4/1991 | Morgan et al. | 604/385.01 |
| 5,639,532 A | * | 6/1997 | Wells | 428/95 |
| 6,006,761 A | * | 12/1999 | Meledandri | 132/320 |
| 6,226,827 B1 | * | 5/2001 | English, Jr. | 15/118 |

* cited by examiner

*Primary Examiner*—John Kim
*Assistant Examiner*—Abraham Bahta (57) ABSTRACT

A multilayer cleaning system (36) has a non-migratory partition wherein the non-migratory partition have two sides (20a) and (20b). The cleaning side of the nonmigratory partition (20a) has a fist absorbent material (22) containing a cleaning solution suitable for cleaning the body. The dual compartment side of the nonmigratory partition (20b) consists two sections, compartment one containing an absorbent material (26) with a desired application solution and compartment two containing a dry absorbent material (28) that can be used or either drying or the application of another solution. Each of the compartments located on side (20b) of the nonmigratory partition is sealed to prevent leakage of liquid and/or air. The multilayer cleaning system (36) is folded in such a manner as to allow insertion within a package or container (30a) that requires pulling a string like device (32) embedded into the package or container to expose the multilayer cleaning system (36).

10 Claims, 6 Drawing Sheets

Fig.6

MULTILAYER PERSONAL HYGIENE SYSTEM

FEDERALLY SPONSORED RESEARCH

Not applicable

SEQUENCE LISTING ON PROGRAM

Not applicable

BACKGROUND

1. Field of Invention

This invention relates to personal hygiene, specifically, to improve the ease of personal hygiene while on the go.

2. Discussion of Prior Art

The personal hygiene industry has, for many years, relied on soap and water to remove the bacteria from our bodies in order to eliminate odors caused by deterioration of said bacteria. For the underarms, the development of deodorant/anti-perspirant has aided in reducing the body odor caused by sweating and the deterioration of said bacteria. With the ever increasing mobility of the public, portable systems for personal hygiene have become a necessity for the comfort and convenience of the public. Of the prior art found, there are several body wipes used for this purpose. One is the Dove Body Refresher Body Deodorant Sheets which is manufactured by Unilever, United States, Inc., this product is currently available in markets and stores. This body wipe is a single use sheet with no segregation between the cleaning solution and the deodorizing solution which allows the cleaning solution, the deodorant and one's perspiration to mingle together. This allows the bacteria that is being wiped away to mingle with the deodorant solution, thus reducing the effectiveness of the deodorant. The offensive odor causing bacteria remains on the person's body and is only masked by the perfume. The duration of time that the bacteria will begin to deteriorate and cause offensive odors to generate is significantly reduced.

Another brand available is Comodynes Towelettes, manufactured by Comodyne, this product is currently available in markets and stores. This product is essentially the same product as the Dove Body Refresher Body Deodorant with all of the same shortcomings.

Prior art found in U.S. Pat. No. 5,639,523 Wells (1991) Multilayer Cleansing Kit and Towel System. This patent requires that the folded towelettes be bonded by a sealing process that adds to manufacturing costs. When opened and exposed, there is no barrier segregating sides one and two, which are allowed to intermingle with each other, allowing bacteria to be transferred from side one to side two, negating the cleansing effect of side two. Side two in this patent is only intended to be used as a drying towel and not intended for the application of any other solution.

Prior art found in U.S. Pat. No. 5,055,216 Johnsons (1991) Multilayer Cleansing Tissue Containing a Perfume and/or Emollient Suitable for Human Skin the layers are not segregated. The intermingling of liquids from one side to the other side during the handling of the wipe cannot be avoided while cleansing or applying the deodorant. This allows bacteria to be transferred from side one to side two, reducing the deodorizing effect of side two. The added sanitary requirement of segregating the deodorant solution from the cleansing solution and segregating the deodorant or other solutions which may be used on the second side that will contact the person's body from the person's hands has not been addressed and, after cleaning the bacteria laden perspiration on the body with the cleaning solution, the deodorant solution is free to intermingle with the bacteria laden perspiration and the cleaning solution, or from transferring to the person's hands has not been addressed by any of the other prior art that has been reviewed.

Those versed in the art of manufacturing a system such as this would discover that bonding the multiple layers containing fluids and emollients would be a very difficult task and quite expensive and does not account for germ and bacteria transference. As described in the description of the preferred embodiments, the cleansing solution, deodorant and/or emollient and perspiration are free to intermingle with each other, and, are designed to do so in order for this system to function.

OBJECTS AND ADVANTAGES

Accordingly, several objects and advantages of this invention are:

(a) To provide a portable personal hygiene system;

(b) To provide a sanitary application of desired solutions;

(c) To provide a system that does not intermingle bacteria from one application area to another;

(d) To provide a cleaning system that is easily opened;

(e) To provide a cleaning system with an increased number of possible applications;

(f) To allow for coin operated dispensing; and (g) To allow for an inexpensive personal hygiene system.

SUMMARY

In accordance with the present invention a cleaning system comprising of one side for cleaning a desired area with cleaning solution to sterilize, a second side with one sealed section compartment one having one absorbent material for applying a desired solution containing perfume, after shave lotion, emollient (deodorant), or powder with a third sealed section compartment two on the same side that has a dry absorbent material for the user to have the option for drying either excessive cleaner or excessive solution and/or for applying a different desired solution such as perfume, after shave lotion, emollient (deodorant) or powder.

DRAWINGS

Drawing Figures

REFERENCE NUMERALS IN DRAWINGS

18a Sealing film bonding strip for the desired application solution.
18b Sealing film bonding strip for the dry absorbent material.
20a Nonmigratory partition, cleaning side.
20b Nonmigratory partition, dual compartment side.
22 Absorbent material with cleaning solution.
24a Peel-off sealing film over the desired application solution absorbent material.
24b Peel-off sealing film over the dry, absorbent material.
26 Absorbent material with desired application solution
28 Dry absorbent material.
30a Rectangular packaging container for the cleansing system.
30b Cylindrical packaging container for the cleaning system.
32 Packaging container opening system.
34a Adhesive for bonding the absorbent material containing the cleaning solution to the nonmigratory partition.
34b Adhesive for bonding the absorbent material with the desired application solution to the nonmigratory partition.
34c Adhesive for bonding the dry absorbent material to the nonmigratory partition.
36 Multilayer Personal Cleaning System.

DETAILED DESCRIPTION

Figure 1:
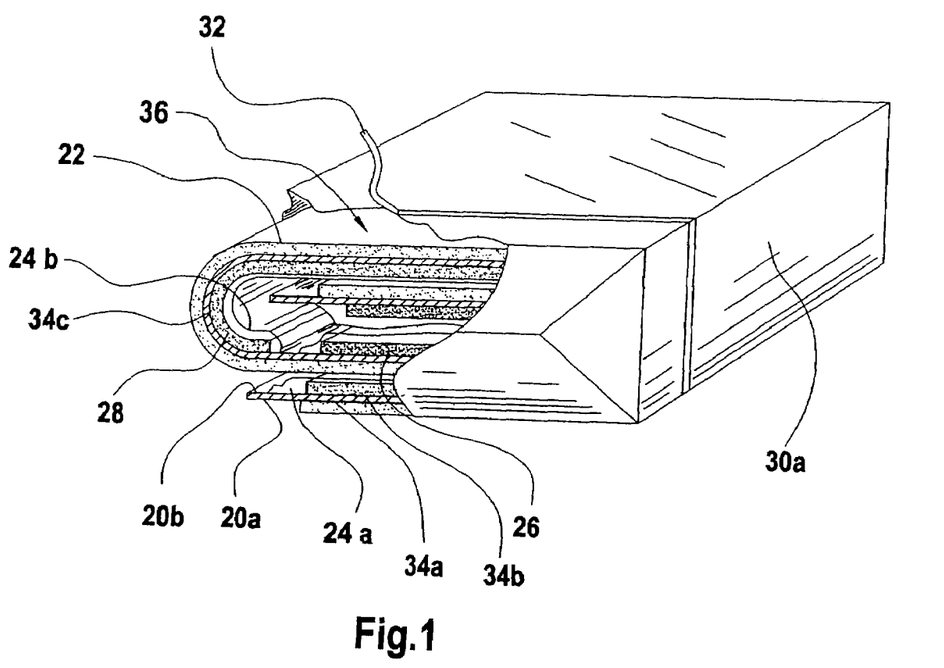
FIG. 1 shows a perspective cut-away view of the packaged cleaning and application system.

DESCRIPTION—FIG. 1 PREFERRED EMBODIMENT

The following detailed description is directed to the presently contemplated mode of carrying out the invention. This description is not intended to be limitative, but be made solely for the purpose of illustrating the general principles of the invention. The various features and advantages of the present invention may be more readily understood with reference to the following detailed description, taken in conjunction with the accompanying drawings, like numbers refer to the same feature or part thereof.

The preferred embodiment of the personal hygiene system of the present invention is illustrated in FIG. 1 a perspective view of the cleaning system contained within the packaging container 30a. The personal hygiene system is comprised of a nonmigratory partition, sides 20a and 20b. An absorbent material 22 containing a cleaning solution is bonded with an adhesive 34a to a nonmigratory partition 20a. On the 20b side of the nonmigratory dual compartment side an absorbent material 26 with a desired application solution is bonded with an adhesive 34b to the nonmigratory partition dual side using approximately one-half of the 20b nonmigratory partition over the absorbent material 26 with the desired application solution is the peel-off sealing film 24a which is sealed to the 20b nonmigratory partition on the dual compartment side being sealed at the sealing film bonding strip 18a which can be bonded by using either a pressure embossing, high frequency welding, or the like to seal the film. At the remaining area approximately one-half of the nonmigratory partition side 20b a dry absorbent material 28 which is bonded with adhesive 34 to the nonmigratory partition 20b there is a peel-off sealing film 24b over the dry absorbent material sealing it to the nonmigratory partition 20b using the sealing film bonding strip 18b which can be bonded by using either a pressure embossing, high frequency welding, or the like to seal the film. The multilayer personal cleaning system 36 can now be folded into a square or rectangular shape and inserted into the packaging container 30a, which is sealed by processes used by those familiar with the art of packaging. The package container 30a would have a package opening system 32 inlaid around the girth of the packaging container 30a. The opening system 32 is inlaid in such a fashion as to cause the package material of the container 30a to tear along the material where the opening system 32 is inlaid. This would cause the package 30a to tear open in a controlled fashion, in a position close enough to one end of the packaging container 30a so to allow a person's fingers to grasp the multilayer personal cleaning system 36, exposing it in this manner facilitating the removal of said Multilayer Personal Cleaning System 36 from the packaging container 30a.

FIGS. 2–6—ADDITIONAL EMBODIMENTS

Figure 2:
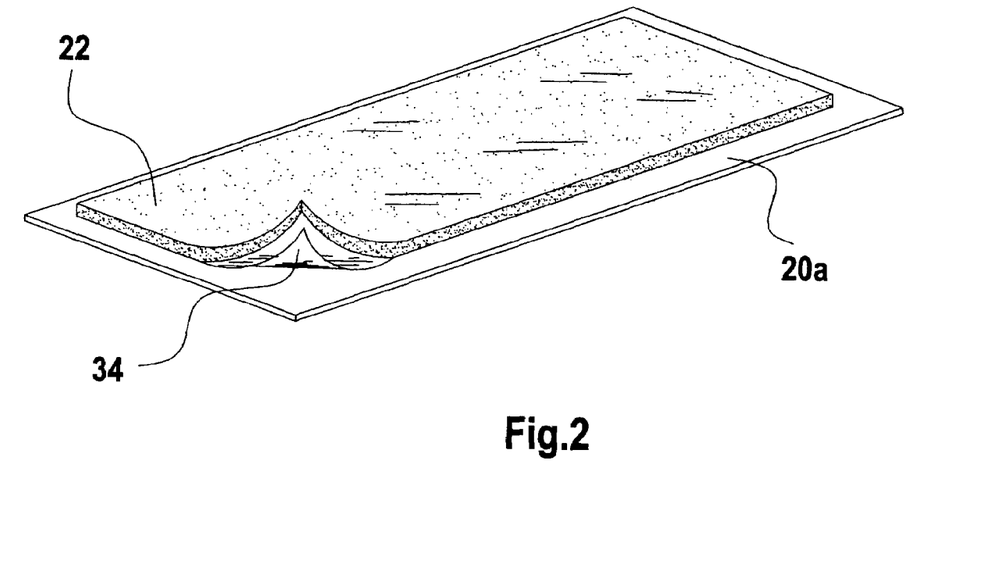
FIG. 2 shows a perspective view of the cleaning system in the open position, with the absorbent material bearing the cleaning agent, facing up. One corner of the absorbent is peeled back exposing the bonding adhesive.

FIG. 2 shows a perspective flat view of the absorbent material 22 peeled back from the nonmigratory partition 20a exposing the layer of adhesive material 34a.

Figure 3:
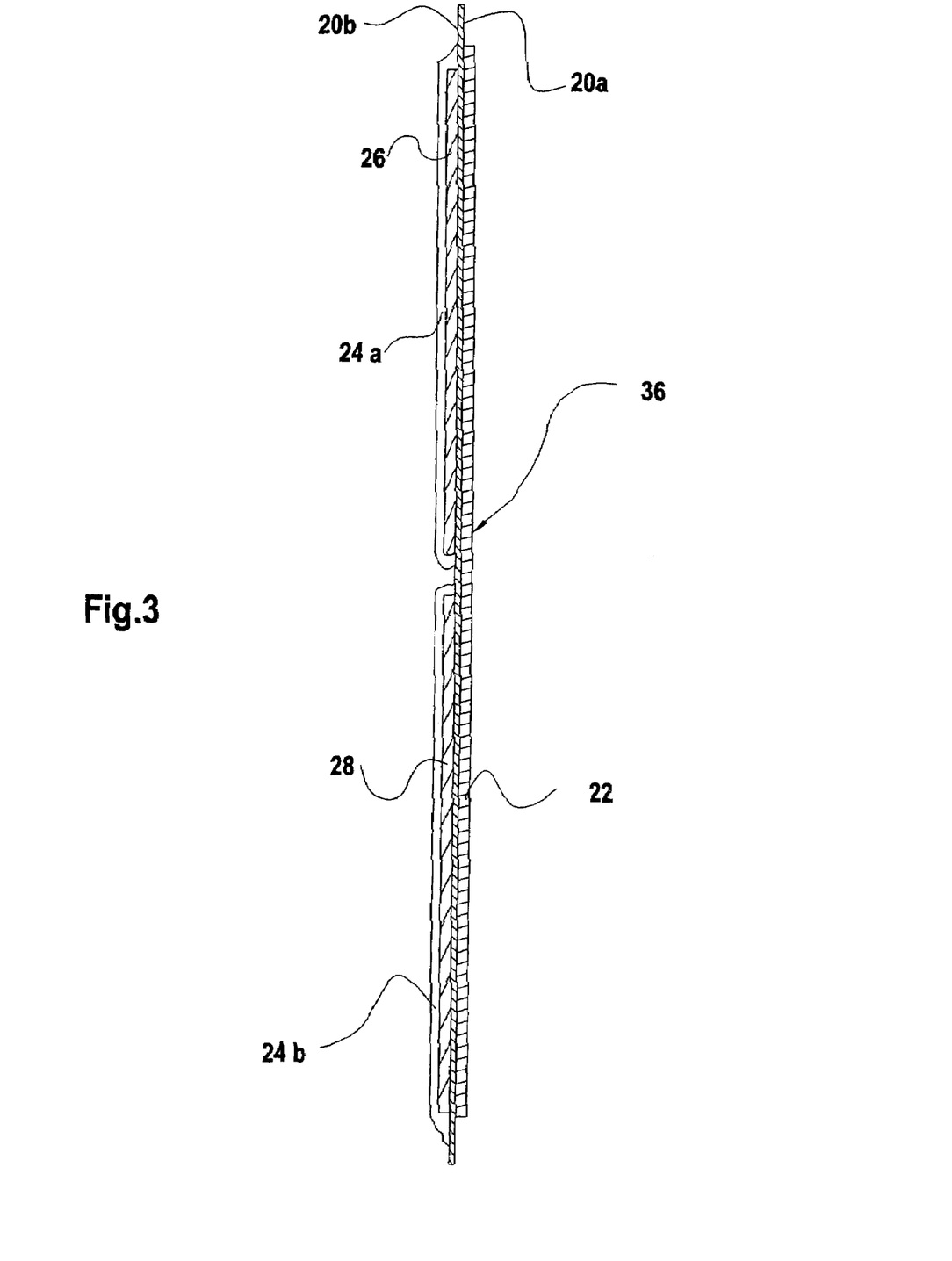
FIG. 3 shows the edge view of the cleaning system in the open position.

FIG. 3 shows an edge view of said Multilayer Personal Cleaning System 36 consisting of the absorbent material 22 attached to the nonmigratory partition 20a with an adhesive for bonding 34a, the absorbent material 26 with the desired application solution 26 are covered with peel-off sealing film 24a and the dry absorbent material 28 are covered with the peel-off sealing film 24b attached to the nonmigratory partition 20b side.

Figure 4:
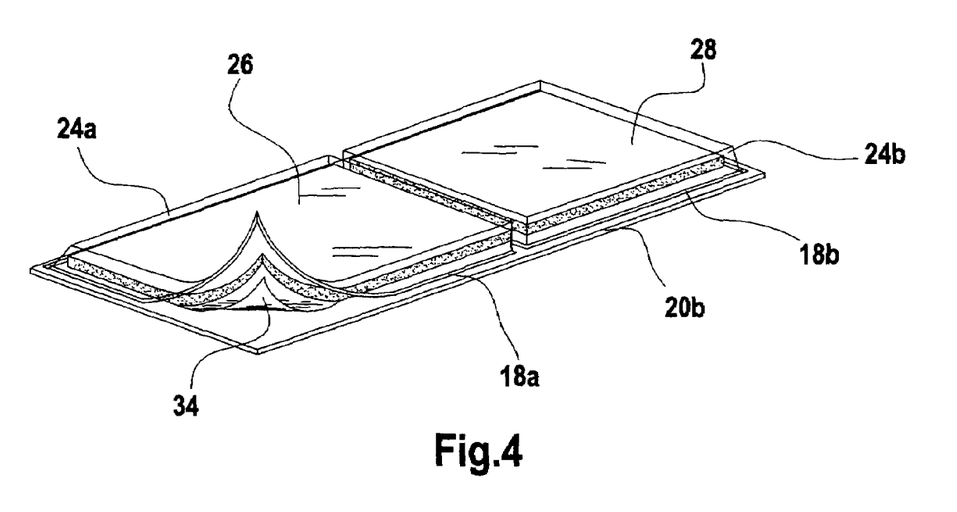
FIG. 4 shows a perspective view of the desired solution absorbent material compartment and the dry absorbent material compartment with the sealing film in place. One corner of the absorbent material containing the desired application solution, along with the peel-off sealing film is peeled back exposing the bonding adhesive.

FIG. 4 is a perspective view showing the dry absorbent material 28 bonded to the nonmigratory partition 20b with an adhesive 34 that is covered by a peel-off sealing film 24b. The portion of the absorbent material 26 with the desired application solution is peeled back along with the peel-off sealing film 24a exposing the partially peeled adhesive 34 from the nonmigratory partition 24b.

Figure 5:
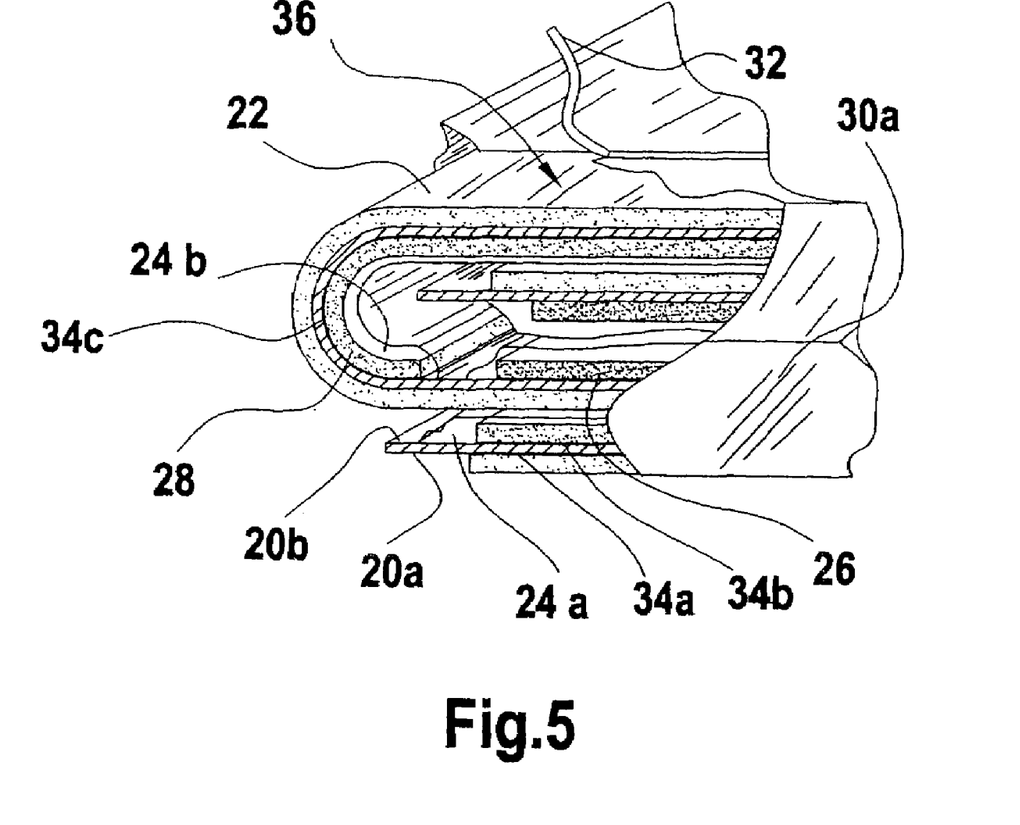
FIG. 5 shows a perspective view of the folded multilayer personal cleaning system in a close-up, depicting the components making up the multilayer personal cleaning system.

FIG. 5 shows a close-up partial view of FIG. 1 of the cleaning system contained within the packaging container 30a. The personal hygiene system is comprised of a nonmigratory partition containing two sides 20a and 20b. An absorbent material 22 containing a cleaning solution is bonded with an adhesive 34a to a nonmigratory partition 20a. On the 20b side of the nonmigratory dual compartment side an absorbent material 26 with a desired application solution is bonded with an adhesive 34b to the nonmigratory partition dual side using approximately one-half of the 20b nonmigratory partition over the absorbent material 26 with the desired application solution is the peel-off sealing film 24a which is sealed to the 20b nonmigratory partition on the dual compartment side with the peel-off sealing film 24a (shown in FIG. 4) which can be bonded by using either a pressure embossing or high frequency welding or the like to seal the film. At the remaining area approximately one-half of the nonmigratory partition side 20b a dry absorbent material 28 which is bonded with adhesive 34c to the non-migratory partition 20 there is a peel-off sealing film 24b over the dry absorbent material 28 sealing it to the nonmigratory partition 20b using the sealing film bonding strip 18b which can be bonded by using either a pressure embossing or high frequency welding or the like to seal the film. The multilayer personal cleaning system 36 can now be folded into a square or rectangular shape and inserted into the packaging container 30a, which is sealed by processes used by those familiar with the art of packaging. The package container 30a would have a package opening system 32 inlaid around the girth of the packaging container 30a. The opening system 32 is inlaid in such a fashion as to cause the package material of the container 30a to tear along the material where the opening system 32 is inlaid. This would cause the package 30a to tear open in a controlled fashion, in a position close enough to one end of the packaging container 30a so to allow a person's fingers to grasp the multilayer personal cleaning system 36, exposing it in this manner facilitating the removal of said Multilayer Personal Cleaning System 36 from the packaging container 30a.

Figure 6:
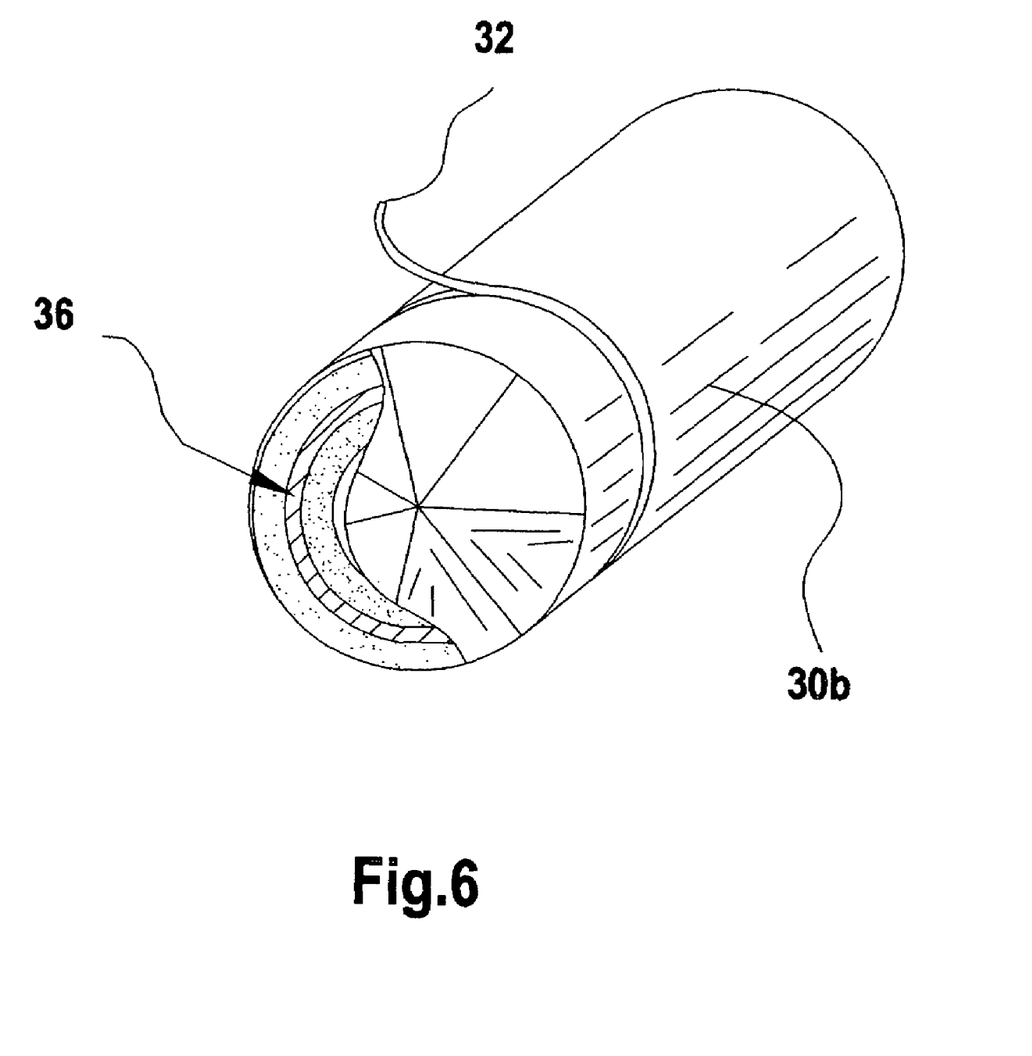
FIG. 6 shows a perspective cut-away view of the multilayer personal cleaning system packaged in a cylindrical shape.

FIG. 6 shows a perspective view of a cylindrical package 30b. The packaging container 30b would have a package opening system 32 inlaid around the girth of the packaging container 30b. The opening system 32 is inlaid in such a fashion as to cause the package material of the container 30b to tear along the material where the opening system 32 is inlaid. This would cause the package 30b to tear open in a controlled fashion, in a position close enough to one end of the packaging container 30b to allow a person's fingers to grasp the multilayer personal cleaning system 36, exposing it in this manner by facilitating the removal of said Multilayer Personal Cleaning System 36 from the packaging container 30b.

Advantages

From the description above, a number of advantages of my multilayer personal cleaning system become evident:

(a) The multilayer personal cleaning system will afford the user a more convenient, portable system, eliminating the need for carrying numerous personal care products.

(b) Having more than two separate application sections available in one easy to use system makes this system much more versatile.

(c) With the use of separate sealing film compartments, a sanitary environment can be maintained until just before using the product within the compartment.

(d) The manufacture of the multilayer personal cleaning system would be very straightforward making the manufacture of this system very cost effective.

(e) The packaging possibilities of this system would make it ideal for coin operated dispensing.

(f) The need to travel lightly, and on a moment's notice requires that travelers "grab and go." which in many cases causes the traveler to forget something, this system, because of the multitude of products contained in one system, will help in these regards.

Operation—FIGS. 1, 2, 3, 4, 5, 6

Opening of the packaging container 30a is accomplished by pulling the packaging container opening system 32 in a circular motion around the girth of the packaging container 30a, following the inlay of the opening system 32. This will tear open the packaging container 30a around the girth of the packaging container exposing one end of the multilayer personal cleaning system 36. Removal of the multilayer personal cleaning system 36 can now be accomplished by grasping with the user's fingers, the exposed end of the multilayer personal cleaning system 36 while grasping the opposite end of the packaging container 30a with the other hand and pulling the multilayer personal cleaning system 36 out of the packaging in container 30a. The multilayer personal cleaning system 36 can now be unfolded. The exposed absorbent material with the cleaning solution 22 can now be used to clean areas of an individual's body.

The sealing film 24 can now be peeled away from the nonmigratory partition 20 along the sealing film bonding strip 18a to expose the absorbent material with desired application solution 26 which may be deodorant, but not limited to that solution. The solution contained in the absorbent material 26 can now be applied to the desired area of cleaned skin. Peeling back the sealing film 24b from the nonmigratory partition 20 along with sealing film bonding strip 18b, exposes dry absorbent material 28. The dry absorbent material 28 may be used for either drying off excess solution during the application of the desired application solution 26 that has been applied.

CONCLUSION, RAMIFICATION, AND SCOPE

Accordingly, the reader will see that the multilayer personal cleaning system of this invention can be used conveniently, inexpensively and quickly for personal hygiene.

It can be made of different dimensions, such as rounded corners with rounded application areas. It allows for a clean and sanitary application of desired solutions, for convenience while on the go, for a variety of application needs, such as, medical and cleaning applications.

Although the description above contains many specificities, these should not be construed as limiting the scope of the invention but as merely providing illustrations of some of the presently preferred embodiments of this invention. For example, the wipe can have other shapes, such as oval or circular absorbent areas. The absorbent material can have a variety of application solutions that go beyond the examples given above.

Thus, the scope of the invention should be determined by the appended claims and their legal equivalents, rather than by the examples given.

I claim:

1. A multilayer cleaning system comprising of, a nonmigratory partition that prevents solutions from passing from one side of the partition to the other, a first layer of absorbent material containing a cleansing solution, said layer is bonded to one side first of the nonmigratory partition, a second layer of absorbent material having two quadrants of absorbent material arranged appropriately for either a rectangular or oval-shaped, said second layer is bonded to the opposite side of the nonmigratory partition forming a unitary system, the edge boundaries of said first layer extend to approximately the edge boundaries of the nonmigratory partition, the dual quadrant boundaries of said second layer are of a smaller size than the boundaries of the nonmigratory partition leaving a space between the two absorbent material quadrants between the boundaries of the quadrants and the outer boundaries of the nonmigratory partition, said second layer having first absorbent material quadrant containing a deodorant solution, said second layer having second absorbent material quadrant left dry for the user to have the option of drying either excessive cleaner or excessive solution, and/or adding a different desired solution such as perfume, after shave, emollient (deodorant) or powder, said second layer having first absorbent material quadrant covered by a film sealing over first absorbent material quadrant wherein the sealing prevents liquid and air from entering the first absorbent material of said second layer, said second layer having a second absorbent material quadrant covered by a film sealing over second absorbent material quadrant wherein the sealing prevents liquid and air from entering the second absorbent material of said second layer.

2. The cleaning system recited in claim 1 wherein, said system is folded approximately into a square or a rectangular shape so that said system is contained within a square or a rectangular package impervious to air or liquid, said package has an opening system positioned so that when said opening system is removed, said cleaning system is exposed for removal from said package.

3. The cleaning system recited in claim 1 wherein, said system is rolled into a cylindrical shape so that said system is contained within a cylindrical container impervious to air or liquid, said cylindrical container is provided with an opening system positioned so that when said opening system is removed, said cleaning system is exposed for removal from said package.

4. The cleaning system recited in claim 1 wherein, said second layer having said first absorbent material quadrant contains a perfume solution.

5. The cleaning system recited in claim 1 wherein, said second layer having said first absorbent material quadrant contains an after shave lotion.

6. The cleaning system recited in claim 1 wherein, said second layer having said second absorbent material quadrant contains an emollient.

7. The cleaning system recited in claim 1 wherein, said second layer having said second absorbent material quadrant contains a powder.

8. The cleaning system recited in claim 1 wherein, said unitary system is formed from biodegradable materials.

9. The cleaning system recited in claim 1 wherein, said unitary system is oval-shaped.

10. The cleaning system recited in claim 1 wherein, said unitary system is round-shaped.

* * * * *